(12) United States Patent
Windbergs et al.

(10) Patent No.: US 8,733,167 B2
(45) Date of Patent: May 27, 2014

(54) METHOD AND DEVICE FOR DETECTING A TANK LEVEL

(75) Inventors: Thor Windbergs, Campinas/Sp (BR);
Andreas Posselt, Muehlacker (DE);
Marko Lorenz, Grossbottwar (DE)

(73) Assignee: Robert Bosch GmbH, Stuttgart (DE)

( * ) Notice: Subject to any disclaimer, the term of this patent is extended or adjusted under 35 U.S.C. 154(b) by 1180 days.

(21) Appl. No.: 12/452,459

(22) PCT Filed: Jul. 2, 2008

(86) PCT No.: PCT/EP2008/058477
§ 371 (c)(1),
(2), (4) Date: Mar. 29, 2010

(87) PCT Pub. No.: WO2009/004020
PCT Pub. Date: Jan. 8, 2009

(65) Prior Publication Data
US 2010/0185360 A1    Jul. 22, 2010

(30) Foreign Application Priority Data

Jul. 4, 2007    (DE) .......................... 10 2007 030 992

(51) Int. Cl.
*G01F 23/00*    (2006.01)
(52) U.S. Cl.
USPC ...................... 73/290 R; 73/1.73; 73/114.54
(58) Field of Classification Search
USPC ........... 701/34, 102, 29, 29.2, 36, 31.3, 1, 14;
73/114.54, 114.53, 114.39, 49.2, 756,
73/49.7, 47, 40, 114.74, 1.73, 295;
702/182, 183, 184; 137/558, 392, 574, 137/576
See application file for complete search history.

(56) References Cited

U.S. PATENT DOCUMENTS

| 5,321,633 | A * | 6/1994 | Kataoka et al. ............... 702/100 |
| 6,260,411 | B1 | 7/2001 | Esteghlal et al. |
| 6,666,084 | B2 * | 12/2003 | Schelhas et al. ............. 73/290 R |
| 6,877,367 | B2 * | 4/2005 | Tsukamoto et al. ........ 73/116.06 |
| 7,865,317 | B2 * | 1/2011 | Begin .............................. 702/55 |
| 8,401,761 | B2 * | 3/2013 | Bohr et al. ..................... 701/102 |
| 2003/0084710 | A1 * | 5/2003 | Tsukamoto et al. ......... 73/118.1 |
| 2003/0136173 | A1 * | 7/2003 | Elenich et al. ................. 73/1.73 |
| 2010/0145638 | A1 * | 6/2010 | Begin ............................. 702/55 |
| 2011/0010070 | A1 * | 1/2011 | Bohr et al. ..................... 701/102 |

FOREIGN PATENT DOCUMENTS

| DE | 103 00 760 | 8/2003 |
| DE | 10 2004 021 094 | 11/2005 |
| DE | 10 2005 016007 | 10/2006 |
| EP | 1 241 452 | 9/2002 |
| FR | 2 547 413 | 12/1984 |

* cited by examiner

*Primary Examiner* — John Fitzgerald
(74) *Attorney, Agent, or Firm* — Kenyon & Kenyon LLP

(57) ABSTRACT

A method for detecting the tank fuel level of a motor vehicle includes: ascertaining the tank level sensor signal ($U_{TSG}$) of a tank level sensor, determining a calculated tank level ($F_{calc}$) as a function of a fuel quantity consumed by the internal combustion engine, and providing a corrected tank level signal as a function of the tank level sensor signal ($U_{TSG}$) and the calculated tank level ($F_{calc}$).

14 Claims, 2 Drawing Sheets

METHOD AND DEVICE FOR DETECTING A TANK LEVEL

BACKGROUND OF THE INVENTION

1. Field of the Invention

The present invention relates to a method and a device for detecting the tank fuel level of a motor vehicle.

2. Description of Related Art

Usually, for detecting a tank fuel level, a tank level sensor makes available a voltage signal as a function of the filling level, which is then evaluated by an instrument cluster, so that a driver may then be provided with a tank level display. Moreover, it is usual that a refueling process is also recorded with the aid of a tank fuel level sensor, by having an increase in the tank level by more than a predetermined boundary value evaluated as a sign of refueling. The tank level sensor is usually based on a potentiometer device, having a lever arm and a float gauge, in this context.

While this arrangement is technically simple and cost-effective to implement, it has the disadvantage that the lever usually has an upper dead-center position, as shown in FIG. 1, above which the tank level sensor signal $U_{TSG\_max}$ does not change any more, even in the case of a rising tank level, and a lower dead-center position, below which the tank level sensor signal $U_{TSG\_min}$ does not change any more, even in the case of a falling tank level. Consequently, there is an upper and a lower dead volume that cannot be detected, since the mechanical lever is at an end stop before this volume is reached.

Furthermore, deposits due to corrosion on the potentiometer path impair the accuracy and the reliability of such a tank level sensor. The corrosion problem intensifies without additional constructive measures, particularly when ethanol-based fuels are used.

A tank level sensor signal that is impaired in its reliability is not only uncomfortable for the driver, who is thus not able to estimate the cruising range to the next nearest filling station, but also leads to problems in the case of so-called Flex-Fuel systems, in which fuels having a different ethanol content are able to be used, and the control of the mixture is calculated as a function of the fuel used. For the calculation and determination of the ethanol content in the fuel used, detection of refueling using tank level sensor signals is used, among other things, in order to avoid unnecessary determination effort and calculation effort. Thus, a malfunction of the tank level sensor in such a FlexFuel system is able to impair the entire engine control.

Besides, the combustion of deviant fuels (such as E85 instead of gasoline) is able to be detected by monitoring changes in the engine response, such a fuel-type detection being admitted only after the detection of a refueling signal, for distinguishing actual fuel-conditioned changes in the engine response from sensor errors. In this connection, methods for detecting the fuel type are also conceivable which go back directly to the tank level signal or its change.

If an accurate and reliably detected tank level signal could be provided, it would be conceivable that exhaust gas-relevant pilot control functions and control functions would be supported by the tank level signal, and would thus use an additional, reliably detectable input parameter. This would further reduce the susceptibility, particularly of the exhaust gas-relevant control and regulating functions with respect to malfunctions of individual sensors or components.

BRIEF SUMMARY OF THE INVENTION

It is therefore an object of the present invention to provide a more accurate, more reliable method for tank level detection, in which, by using components that are already present in the motor vehicle, at most minor additional measures are required compared to the usual detection of the tank level.

Consequently, the present invention provides a method for detecting the tank level of a motor vehicle having an internal combustion engine, including the following steps:

ascertaining the tank level sensor signal of a tank level sensor, determining a calculated tank level as a function of a fuel quantity consumed by the internal combustion engine, and providing a corrected tank level signal as a function of the tank level sensor signal and the calculated tank level.

A reliable tank level signal is provided by the method according to the present invention, which is able to be used for various control functions of the engine operation, without requiring the use of technically costly sensors or the like. Determining the fuel quantity consumed by the internal combustion engine may be done, in this connection, by evaluating signals which are already being monitored and ascertained in the internal combustion engine in any case, so that no additional components have to be installed to carry out the method according to the present invention.

Furthermore, no additional measures have to be carried out in the method according to the present invention, compared to the usual, inaccurate and unreliable detection of the tank level, and consequently, no additional costs are created as compared to the usual tank level detection.

According to one example embodiment of the present invention, the tank level sensor signal is smoothed and/or filtered, especially taking into account boundary conditions such as with respect to the vehicle position, the vehicle acceleration and the time interval since the last refueling. Artifacts in the raw data of the tank level sensor signal, which are conditioned upon the electrical and mechanical properties of the tank level sensor or by the sloshing of fuel may thereby be removed, and consequently, the accuracy of the tank level sensor signal is able to be improved. According to one example embodiment of the present invention, the tank level sensor signal may be linearized in this instance.

In order to be able to provide simply a calculated tank level, without additional components and sensors, according to one example embodiment of the present invention, the determination of the calculated tank level takes place by using the determination of the intake air quantity at a known fuel/air ratio and/or using the determination of the opening times of the injection valves and of the fuel pressure, and calculating a tank level from this.

In order to be able to provide as accurate as possible a value for the calculated tank level, the determination of the fuel quantity consumed by the internal combustion engine may further be carried out as a function of engine operating conditions, such as the engine temperature and/or the tank ventilation and/or the operating state of a lambda probe.

For the simple recalculation of the tank level sensor signal into a value for the tank level, which may then be compared to a calculated tank level, it is basically preferred that the raw data of the tank level sensor signal be linearized. However, if this is not possible for a certain case, based on the shape of the fuel tank or the properties of the tank level sensor used, it is also possible to use a nonlinear tank level sensor signal (particularly a smoothed or filtered one), one being then able to ascertain a value for the tank level from the tank level sensor signal, with the aid of a characteristics curve that was stored ahead of time in the engine control unit, without great additional calculation costs.

According to one example embodiment of the present invention, the slope of the tank level sensor signal is corrected as a function of the slope of the calculated tank level, so as to ascertain the corrected tank level signal. Such a slope correction may, for instance, be made by ascertaining, at two specified times, in each case one value for the tank level from the tank level sensor signal and a calculated tank level, and comparing to one another the difference of the two tank levels determined from the tank level sensor signals and the two calculated tank levels. If the difference of the tank level determined from the tank level sensor signals deviates from the difference of the calculated tank levels, the tank level sensor signal that was ascertained last is appropriately corrected and provided as the corrected tank level signal.

In this connection, in particular, a malfunction of the tank level sensor is emitted if the correction value for the slope of the tank level sensor signal exceeds a specified boundary value. Thereby a failure of the tank level sensor may be easily detected, and thus the reliability of the tank level sensor signal is able to be improved.

According to one example embodiment of the present invention, a check of the plausibility of the tank level sensor signal is also carried out, in order to detect malfunctions of the tank level sensor early, the plausibility check outputting a malfunction of the tank level sensor if the calculated fuel quantity used deviates by a certain amount or more from a fuel quantity ascertainable from the tank level sensor signal. A malfunction of the tank level sensor may especially be output if the tank level sensor signal is at its upper dead-center, and the calculated fuel quantity used since the last refueling is greater than the upper dead volume of the tank level sensor, or if the tank level sensor signal is at its lower dead-center and the calculated fuel quantity used since reaching the lower dead-center is greater than the lower dead volume of the tank level sensor.

Moreover, the present invention provides a device including an internal combustion engine, a fuel tank equipped with a tank level sensor, and an engine control unit, the engine control unit being developed in such a way that it carries out a method according to the present invention, for detecting the tank level, as described above.

DETAILED DESCRIPTION OF THE INVENTION

Figure 1:
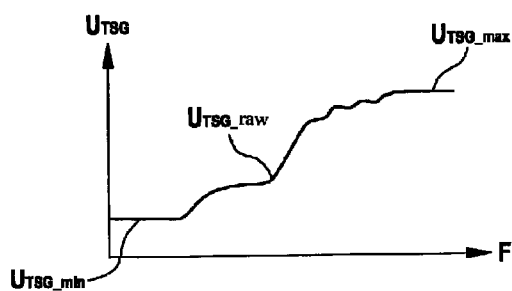
FIG. 1 shows a graph which schematically illustrates the voltage signal emitted by a conventional, potentiometer-based tank level sensor as a function of the tank level.
Figure 2:
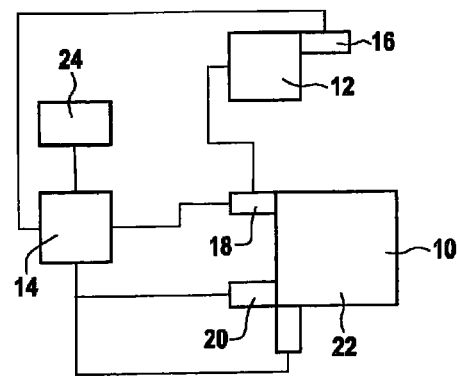
FIG. 2 shows a schematic representation of the engine components and the sensors used in the method according to the present invention for tank level detection.

As shown schematically in FIG. 2, an engine 10 is connected to an engine control unit 14 in such a way that various engine components, such as fuel injectors 18, intake manifolds 20 and a lambda probe 22 are monitored and controlled by engine control unit 14. Furthermore, a fuel tank 12 has a tank level sensor 16, which is developed, for instance, as a usual potentiometer device having a float and a lever, and which emits a voltage signal $U_{TSG}$ to engine control unit 14 that is a function of the tank level.

In addition, there are further sensors 24 connected to engine control unit 14, for instance, for measuring the engine temperature, the acceleration and the travel speed of the motor vehicle and the like.

Figure 3:
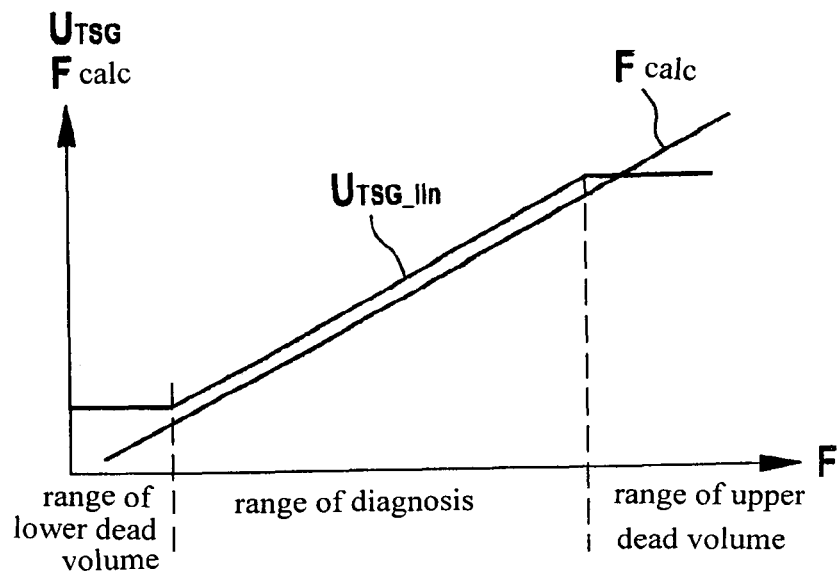
FIG. 3 shows a graph which shows a linearized tank level sensor signal together with a tank level calculated from the engine fuel consumption according to the present invention.

The signal $U_{TSG}$ emitted by tank level sensor 16 is smoothed by suitable filters and is linearized ($U_{TSG\_lin}$), as shown in FIG. 3. Artifacts caused, for instance, by sloshing of the gasoline in the tank, can be removed by low-pass filtering, in this connection. Furthermore, the vehicle's position and the vehicle acceleration, which influence the liquid level in the vicinity of the tank level sensor float, are able to be taken into account by, for example, ascertaining correction values for the vehicle position and/or the vehicle acceleration from a stored characteristics map, and adding them to the filtered tank level sensor signal. Alternatively, the evaluation or the valuation of the tank level sensor signal may be suppressed or interrupted in such critical vehicle states.

At the same time, the fuel volume consumed in this time interval by engine 10 is calculated at regular time intervals, a pressure sensor in intake manifold 20 measuring the air required by engine 10, and lambda probe 22 recording the fuel/air ratio. Using the lambda value and the air mass consumed, the fuel quantity consumed in the internal combustion engine may be calculated from the equation $$Q_{engine} = \frac{Q_{air} * \lambda}{Q_{stoichiometric}},$$

where $Q_{engine}$ is the fuel quantity consumed by the engine, $Q_{air}$ is the air quantity consumed by the engine, $\lambda$ is the fuel/air ratio and $Q_{stoichiometric}$ is the stoichiometric number. In making this calculation, additional boundary values, such as the engine temperature, the tank ventilation or the activity of the lambda probe may also be drawn upon.

From the fuel quantity consumed that is calculated in this manner, a tank level $F_{calc}$ is determined which, as shown in FIG. 3, is able to be compared to linearized tank level signal $U_{TSG\_lin}$ of tank level sensor 16, for the same time period. Consequently, using calculated tank level $F_{calc}$, in the range of the upper and the lower dead volumes, in which usually no exact tank level signal was able to be detected, the tank level may now also be given with improved accuracy, with the aid of signal $F_{calc}$ that is calculated from the engine's fuel consumption.

Figure 4:
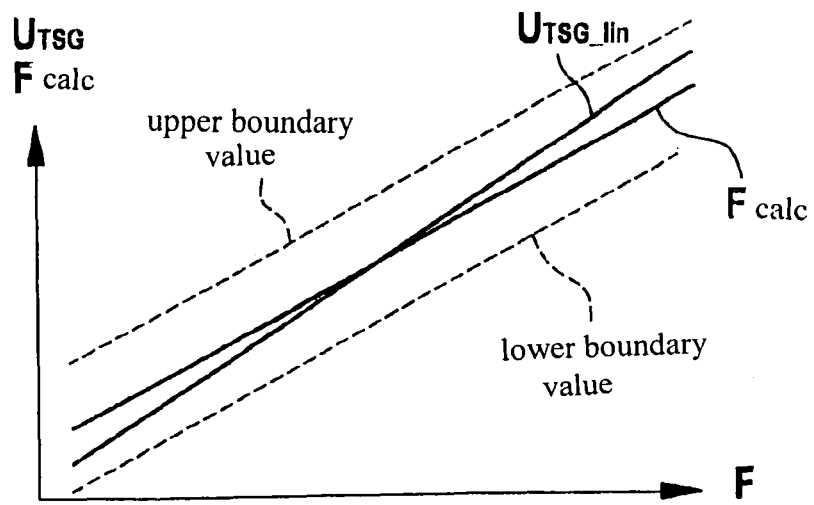
FIG. 4 shows a graph illustrating a slope correction of the tank level sensor signal.

Furthermore, tank level signal $F_{calc}$, calculated from the engine's fuel consumption, is also able to be used for the correction and the plausibility check of the linearized tank level sensor signal $U_{TSG\_lin}$, as shown in FIG. 4. In this case, the absolute deviation of linearized tank level sensor signal $U_{TSG\_lin}$ from tank level signal $T_{calc}$, calculated from the engine's fuel consumption, is compared to specified boundary values, and it is determined that a malfunction of tank level sensor 16 occurred if the deviation of signals $U_{TSG\_lin}$ and $F_{calc}$ from each other is greater than the predefined boundary value respectively. Such a malfunction of tank level sensor 16 may then be signaled to the driver, for instance, by lighting up a warning signal.

An additional plausibility check of linearized tank level sensor signal $U_{TSG\_lin}$ may be made in the vicinity of the upper and the lower dead volume. A malfunction of tank level sensor 16 is also signaled to the driver if tank level sensor signal $U_{TSG}$ is at its upper dead-center $U_{TSG\_max}$, and the calculated consumed fuel quantity since the last refueling is greater by a certain tolerance value than the upper dead volume of tank level sensor 16, or if tank level sensor signal $U_{TSG}$ is at its lower dead-center $U_{TSG\_max}$ and the calculated consumed fuel quantity since reaching this signal value $U_{TSG\_min}$ of tank level sensor signal $U_{TSG}$ is greater by a certain tolerance value than the lower dead volume of tank level sensor 16.

When it has become certain that there is no malfunction of tank level sensor 16, the slope of tank level sensor signal $U_{TSG\_lin}$ may be corrected in a given time interval to the extent that it agrees with the slope of tank level $F_{calc}$ calculated from the engine's fuel consumption for the same time interval. The accuracy of tank level sensor signal $U_{TSG}$ is able to be improved by this correction, and consequently, in particular, the detection of a refueling (which is based upon an upward change in tank level sensor signal $U_{TSG}$ by a specified minimum value, and is thus a function of the slope of tank level sensor signal $U_{TSG}$) may take place more reliably. Furthermore, with the aid of the corrected tank level sensor signal, an accurate tank level signal may be provided, without having to determine calculated tank level $F_{calc}$ continuously.

Consequently, the method according to the present invention has the advantage that, without the necessity for new sensors and measuring methods, and only by using components that are already present in the engine compartment and in the fuel tank, a tank level signal is able to be provided which is substantially more accurate and reliable than was possible up to now. Thus, an altogether more reliable and more robust engine control is made possible, especially in FlexFuel systems, in which both a refueling signal and a tank level signal are able to be used in controlling the mixture.

What is claimed is:

1. A method for detecting a fuel tank level of a motor vehicle having an internal combustion engine, comprising:
   ascertaining a tank level sensor signal of a tank level sensor;
   determining a calculated tank level as a function of a fuel quantity consumed by the internal combustion engine;
   at least one of smoothing and filtering the tank level sensor signal while taking into account specified boundary values including at least one of vehicle position, vehicle acceleration and the time since the last refueling; and
   providing a corrected tank level signal as a function of the tank level sensor signal and the calculated tank level;
   wherein the corrected tank level signal is determined by correcting a slope of the tank level sensor signal as a function of a slope of the calculated tank level.

2. The method as recited in claim 1, wherein the determination of the calculated tank level includes:
   (a) determining at least one of (i) an intake air quantity at a known fuel/air ratio and (ii) opening times of the fuel injectors and the fuel pressure; and
   (b) calculating the tank level based on the at least one of the determined intake air quantity and the determined opening times.

3. The method as recited in claim 1, wherein the determination of the fuel quantity consumed by the internal combustion engine is achieved as a function of at least one indicator of engine operating condition, the at least one indicator including the engine temperature, the tank ventilation and the operating state of a lambda probe.

4. The method as recited in claim 1, wherein both of the tank level sensor signal and the calculated tank level contribute to a determination of the corrected tank level signal, and the function by which the corrected tank level signal is determined allows for the corrected tank level signal, to which both of the tank level sensor signal and the calculated tank level contribute, to be different than both of the tank level sensor signal and the calculated tank level.

5. The method as recited in claim 1, further comprising:
   ascertaining a value for the tank level from the tank level sensor signal with the aid of a predetermined characteristics curve stored in an engine control unit;
   wherein the corrected tank level signal is provided as a function of the ascertained value for the tank level and the calculated tank level.

6. The method as recited in claim 1, further comprising:
   providing an indication of a malfunction of the tank level sensor if the correction value for the slope of the tank level sensor signal exceeds a specified boundary value.

7. The method as recited in claim 1, further comprising:
   providing an indication of a malfunction of the tank level sensor if a deviation between a calculated value for the fuel quantity consumed and a fuel quantity represented by the tank level sensor signal exceeds a specified tolerance amount.

8. The method as recited in claim 7, wherein the indication of a malfunction of the tank level sensor is provided if one of: (a) the tank level sensor signal corresponds to a level at a specified upper threshold and the calculated fuel quantity used since the last refueling exceeds the volume corresponding to the specified upper threshold by the specified tolerance amount; or (b) the tank level sensor signal corresponds to a level at a specified lower threshold and the calculated fuel quantity used since last reaching the specified lower threshold exceeds the volume represented the lower threshold by the specified tolerance amount.

9. The method as recited in claim 1, wherein the corrected tank level signal indicates a tank level different than that indicated by the tank level sensor signal and different than that indicated by the calculated tank level.

10. The method as recited in claim 9, further comprising:
    calculating the corrected tank level signal by determining a change between the calculated tank level and an earlier calculated tank level, and determining a value whose difference from an earlier tank level sensor signal corresponds to the determined change, the value being selected as the corrected tank level signal.

11. A control unit for monitoring a fuel tank level of a motor vehicle having an internal combustion engine, comprising:
    means for receiving and ascertaining a tank level sensor signal transmitted by a tank level sensor;
    means for determining a calculated tank level as a function of a fuel quantity consumed by the internal combustion engine;
    means for at least one of smoothing and filtering the tank level sensor signal while taking into account specified boundary values including at least one of vehicle position, vehicle acceleration and the time since the last refueling; and
    means for providing a corrected tank level signal as a function of the tank level sensor signal and the calculated tank level;
    wherein the corrected tank level signal is determined by correcting a slope of the tank level sensor signal as a function of a slope of the calculated tank level.

12. A control unit for monitoring a fuel tank level of a motor vehicle having an internal combustion engine, comprising:
    a processor configured to:
       obtain a tank level sensor signal from a tank level sensor;

determine a calculated tank level as a function of a fuel quantity consumed by the internal combustion engine;

at least one of smooth and filter the tank level sensor signal while taking into account specified boundary values including at least one of vehicle position, vehicle acceleration and the time since the last refueling; and output a corrected tank level signal as a function of the tank level sensor signal and the calculated tank level;

wherein the corrected tank level signal is determined by correcting a slope of the tank level sensor signal as a function of a slope of the calculated tank level.

13. A control unit for monitoring a fuel tank level of a motor vehicle having an internal combustion engine, comprising:

a processor configured to:

obtain a tank level sensor signal from a tank level sensor corresponding to a first level of the tank;

at least one of smooth and filter the tank level sensor signal while taking into account specified boundary values including at least one of vehicle position, vehicle acceleration and the time since the last refueling;

determine a first calculated tank level corresponding to the first level of the tank and as a function of a fuel quantity consumed by the internal combustion engine;

determine a second calculated tank level corresponding to a second level of the tank and as a function of a fuel quantity consumed by the internal combustion engine;

calculate a corrected tank level signal based on the tank level sensor signal, the first calculated tank level, and the second calculated tank level; and output the corrected tank level signal as a representation of the second tank level;

wherein the corrected tank level signal is determined by correcting a slope of the tank level sensor signal as a function of a slope of the calculated tank level.

14. The control unit as recited in claim 13, wherein all of the tank level sensor signal and the first and second calculated tank levels contribute to the calculation of the corrected tank level signal, and a function by which the corrected tank level signal is determined allows for the corrected tank level signal, to which all of the tank level sensor signal and the first and second calculated tank levels contribute, to be different than all of the tank level sensor signal and the first and second calculated tank levels.

* * * * *